United States Patent [19]
White et al.

[11] Patent Number: 5,561,554
[45] Date of Patent: Oct. 1, 1996

[54] CONFOCAL IMAGING SYSTEM FOR MICROSCOPY

[75] Inventors: John G. White; William B. Amos, both of Cambridge; James M. Fordham, Fordham, all of United Kingdom

[73] Assignee: Medical Research Council, London, England

[21] Appl. No.: 388,145

[22] Filed: Feb. 13, 1995

Related U.S. Application Data

[62] Division of Ser. No. 969,142, filed as PCT/GB91/01268, Jul. 26, 1991, Pat. No. 5,452,125.

[30] Foreign Application Priority Data

Jul. 28, 1990 [GB] United Kingdom .................. 9016632

[51] Int. Cl.⁶ .................................................. G02B 21/00
[52] U.S. Cl. ......................... 359/368; 359/201; 359/385; 359/729; 359/731
[58] Field of Search .................................... 359/368, 369, 359/385, 389, 729, 731, 201, 202, 208, 213, 220; 250/235–236

[56] References Cited

U.S. PATENT DOCUMENTS

| | | | |
|---|---|---|---|
| 5,020,891 | 6/1991 | Lichtman et al. | 359/368 |
| 5,032,720 | 7/1991 | White | 359/368 |

*Primary Examiner*—James Phan
*Attorney, Agent, or Firm*—Lee, Mann, Smith, McWilliams, Sweeney & Ohlson

[57] ABSTRACT

A confocal imaging system for use in conjunction with an optical microscope, in which a slit-shaped or bar-shaped beam of light is scanned over the specimen, descanned with a fixed mask and rescanned for viewing or recording, the focusing and scanning system being constituted by wholly reflective optical systems.

19 Claims, 1 Drawing Sheet

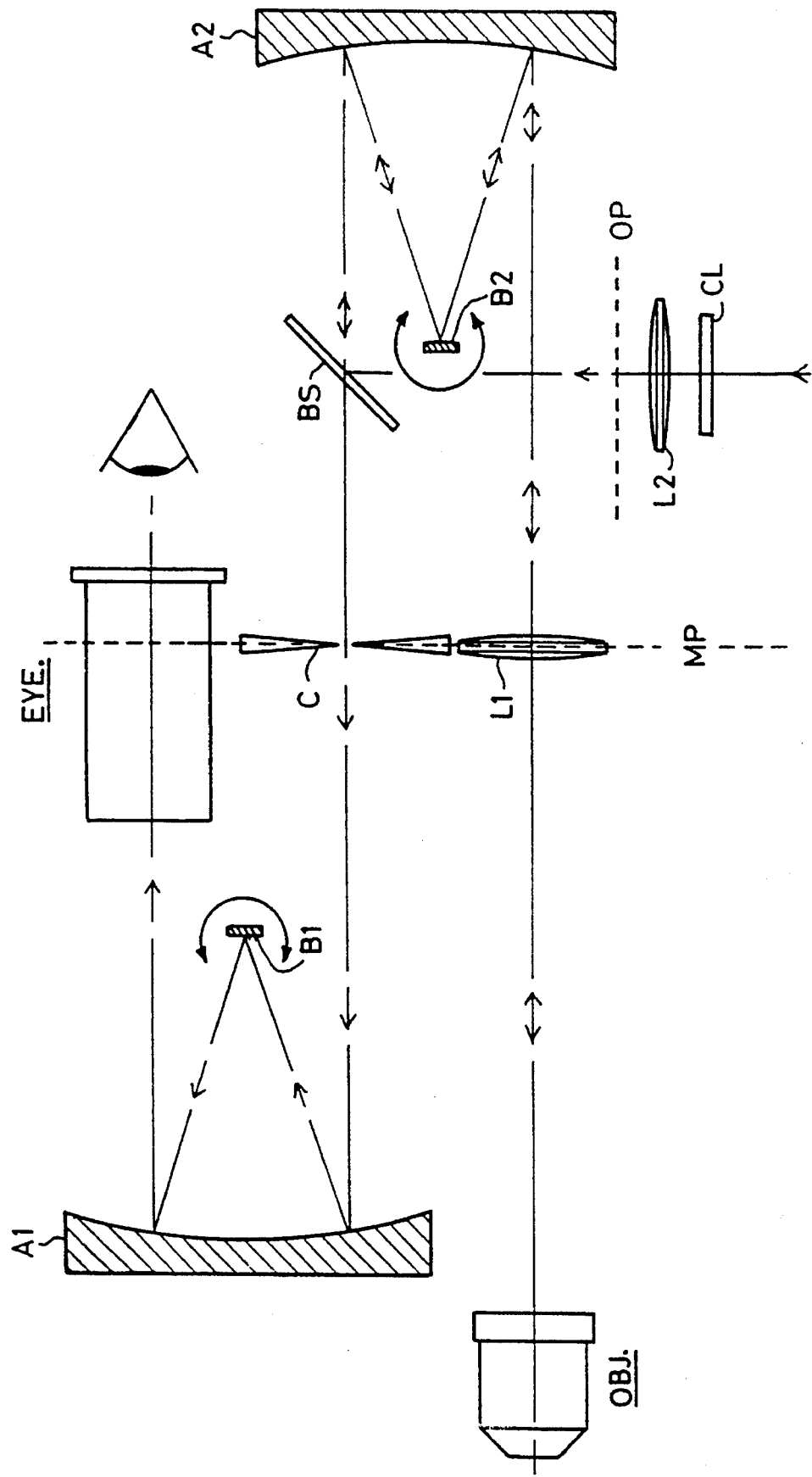

CONFOCAL IMAGING SYSTEM FOR MICROSCOPY

This application is a division of U.S. patent application Ser. No. 07/969,142, filed Jan. 25, 1993, U.S. Pat. No. 5,452,125 which is the national application of Patent Cooperation Treaty application PCT/GB91/01268, filed Jul. 26, 1991.

FIELD OF THE INVENTION

This invention relates to a confocal imaging system for microscopy and, in particular, to such a system which utilises slit scanning.

PRIOR ART

The principle of confocal imaging was first described by Minsky (see U.S. Pat. No. 3,013,467). Moving-slit, confocal imaging systems have been described by Baer (U.S. Pat. No. 3,547,512 and Lichtman (see Lichtman, J. W., Sunderland, W. J., and Wilkinson, R. S. (1989) in The New Biologist 1, 75–82. Also, forms of confocal microscope have been described in which a slit or bar pattern of light is scanned across the specimen and an image of this pattern formed by reflection or emission from the specimen is caused to fall on a stationary-slit-shaped aperture. This use of a stationary slit is a feature of the systems described by Koester (Koester, C. J. (1980) Appl. Optics 19, 1749–1757., Burns et al. (Burns, D. H., Hatangadi. R. B. and Spelman, F. A. (1990) Scanning, 12, 156–160) and of the design of Brakenhoff and Visscher (Brakenhoff, G. J. & Visscher, K. (1990) Trans. Roy. microsc. Soc. 1, 247–250). A reflecting autocollimating system with no primary aberrations was described by Offner (see A. Offner, Optical Engineering (1975), 14, 131).

BACKGROUND OF THE INVENTION

Confocal imaging systems have become established as an effective means of eliminating out-of-focus interference in optical microscopy. In these systems only a very small area in the object plane is illuminated at any given time. The illumination in the object plane may be in the form of a single point, an array of points, a single line or an array of lines. A mask with the same geometrical form as the illuminating pattern is incorporated in a plane conjugate with the object plane, so that only signals from the immediate vicinity of the illuminated regions are admitted through the mask into the viewing system. In this way, interfering signals emanating away from the illuminated regions are rejected. A complete image is built up by scanning the illuminating pattern in such a way as to cover the whole of the area of the object plane, while keeping the mask in register with the illumination.

There are advantages in using a slit or array of slits rather than a single point as the pattern of illumination. For example, a complete image can be formed more rapidly and the instantaneous intensity of illumination required at any single point in the specimen can be reduced. An increase in the rate of formation of images (framing rate) is of particular value, since it can be used with direct visual observation to create the impression of continuous imaging. If a slit is used, it is desirable to be able to vary the width of the slit in the mask relative to that of the illuminated slit-shaped area. In some prior art, such as that of Lichtman, this is impossible, since one and the same mask serves to define both the illumination and the area of detection. The closest prior art, in this respect, is that of Koester, of Burns et al. and of Brakenhoff and Visscher, where the system is so constructed that the detection mask is stationary, so that the mask is easy to adjust in a continuous fashion during the operation of the microscope system. Koester's system fails to employ the full aperture of the objective lens of the microscope and is therefore compromised in image quality. The system of Baer depends on chromatic dispersion for its operation and is therefore not suitable for the main field of application of confocal microscopes, which is the examination of fluorescence in specimens The closest prior art (ie that of Burns et al. and Visscher and Brakenhoff) requires lenses to relay the image within the apparatus. This presents considerable problems since the chromatic performance of lenses is poor outside the restricted range of wavelengths for which they are designed. Also, in order to make the instrument conveniently small, the relay lenses must have high numerical apertures, which makes them difficult to design and expensive to manufacture.

THE INVENTION

According to the present invention, there is provided, in combination with a microscope, a confocal imaging system comprising means for forming a slit-shaped or bar-shaped illuminating beam, or an array of such beams, a beam-splitting means by which the light is directed into an optical microscope having an objective lens, and an optical scanning means means whereby the illuminating beam or beams is or are caused to scan and be directed into the objection lens of the microscope in order to scan the specimen, such optical scanning means consisting of a wholly reflective optical system for both focussing and scanning.

Preferably, the same reflective optical system causes the emitted or reflected beam to be descanned (ie brought to a stationary state) and focussed upon a stationary confocal mask such as a slit of variable width, or an array of such slits.

The stationary slit image delimited by the mask can then be rescanned by a second wholly reflective optical system and brought to focus within an eyepiece or upon the photosensitive surface of a video camera as a two-dimensional image.

In a preferred embodiment the first-mentioned reflective system, and likewise the second reflective system, consists of a modified Offner autocollimation system, in which the inner element of the Offner system is caused to oscillate. This modification converts the known Offner relay into a unique reflective scanning system.

The use of reflective elements for focussing at appropriate points in the system is also an improvement over prior art, in that such elements are inexpensive to manufacture and perform well over a very wide range of wavelengths

DESCRIPTION OF EMBODIMENT

The confocal imaging system according to the invention is exemplified in the following description, making reference to the single figure of drawings, in which a preferred system is shown schematically.

The system is interposed between the objective (OBJ) an the eyepiece (EYE) of a conventional microscope. It includes two modified Offner reflecting autocollimation units (A1,B1 and A2,B2).

An Offner autocollimation system consists of a pair of mirrors with radii of curvature in the ratio 1:2. The mirror of smaller radius is convex, the other concave. As described by Offner, this system functions as a 1:1 optical relay if light is reflected through it in the manner shown in the drawing. Thus, the Offner system consisting of mirrors A1 and B1 focusses the slit C at the plane shown as a dotted line in the eyepiece (EYE). The other Offner system, consisting of mirrors A2 and B2, creates conjugate foci in the plane OP and on the median plane MP at the slit C and within the lens L1. The value of the Offner system in the present context is its ease of fabrication, total achromatism and freedom from primary aberrations.

Illumination is injected via a beam splitter (BS). The light could be provided by an illuminated slit. However, in the preferred embodiment a slit is not used. Instead a parallel laser beam is passed through a cylindrical lens (CL) and then through a conventional spherical lens (L2) to provide a focussed line of laser light in the plane OP which is conjugate with the object plane. The illuminating beam is directed through the Offner unit proximal to the microscope (B2, A2).

In accordance with the invention, the Offner units are modified in that the convex mirrors B1 and B2 are each caused to oscillate about an axis perpendicular to the plane of the diagram, whereby the beam is caused to scan.

Both of the convex mirrors shown in FIG. 1 lie in the aperture planes in relation to the microscope rather than in imaae planes and they are therefore ideally placed to serve as scaning elements.

The light passes from B2 in a scanning state and enters the objective lens (OBJ) via a field lens L1, which functions to bring the back aperture of the objective into a plane conjugate with that of B2. The signal from the object being illuminated then traverses this path in reverse and is descanned by the mirror B2. It then passes through the beam splitter BS to the masking slit C where it is brought into focus and traverses the slit. Interfering signals emanating from regions away from the illuminated line are rejected by the slit. The slit is adjustable in width to allow stringent confocal conditions to be imposed (slit narrow) or a brighter image of a less confocal nature to be formed (slit wide). The oscillating mirror B1 in the second modified Offner unit acts to rescan the signal, recreating at the miccroscope a two-dimensional image in the mid-plane (MP) which can be viewed directly with the eyepiece or be recorded in a camera.

The movement of the convex mirrors B1 and B2 may take any form that scans the whole field, but sweeps of uniform angular velocity in alternate directions are preferable as this reduces dead time and gives an image of uniform brightness. In the preferred embodiment the mirror B2 works in synchronism but antiphase to the oscillating mirror B1.

The beam splitter BS could be either a simple device producing and desired ratio of reflected and transmitted intensities, or alternatively a dichromatic reflector (dichroic) as is conventional in fluorescence microscopy.

We claim:

1. In combination with an optical microscope having an objective, a confocal imaging system comprising means for forming a slit-shaped illuminating beam, a beam splitting means, a first optical relay system receiving an illuminating beam from the beam splitting means and including a scanning element, the slit-shaped illuminating beam being directed from said first optical relay system into the objective of the microscope for scanning a specimen, a return beam from the specimen being directed to the first optical relay system to be descanned, and a second optical relay system receiving the descanned return beam through the beam splitting means, said second optical relay system comprising a modified Officer collimating system including an inner mirror caused to rotate to rescan the return beam and direct said rescanned return beam to form a focused image of the specimen.

2. The combination claimed in claim 1, wherein the first optical relay system is a wholly reflective system.

3. The combination claimed in claim 2, in which the first optical relay system causes the descanned beam to be focused through the beam splitting means on a slit-shaped confocal mask, from which the beam passes to the second optical relay system.

4. The combination claimed in claim 3, in which the mask is a slit of variable width.

5. In combination with an optical microscope, a confocal imaging system which comprises means for forming a slit-shaped illuminating beam, a beam splitting means, a first modified Offner collimating system receiving the illuminating beam from the beam splitting means, said first modified Offner collimating system including an inner mirror caused to rotate to scan the illuminating beam, the illuminating beam then being directed into the microscope objective for scanning a specimen, and a second modified Offner collimating system receiving a descanned beam returned from the microscope objective through the first modified Offner collimating system and the beam splitting means, said second modified Offner collimating system having an inner mirror caused to rotate to rescan the return beam, the rescanned return beam being directed from the second modified Offner collimating system to form a focused image of the specimen.

6. The combination according to claim 5, in which the means for forming the slit-shaped illuminating beam includes a cylindrical lens which shapes the beam by refraction.

7. The combination according to claim 6, in which the illuminating beam is a laser beam.

8. The combination according to claim 5, in which the full aperture of the lens of the microscope objective is used.

9. The combination according to claim 5, in which the illuminating beam is directed into the microscope objective through a field lens.

10. In combination with an optical microscope having an objective and an eyepiece, a confocal imaging system comprising first and second modified Offner collimating systems located in an optical path between the objective and the eyepiece, each modified Offner collimating system having a rotating inner mirror, a beam splitting means located in the optical path between the first and second modified Offner collimating systems, and means for causing a slit-shaped illuminating beam, elongated in the first of two orthogonal planes, to be incident on the beam splitting means, whereby the illuminating beam from the beam splitting means is scanned by the first modified Offner collimating system in the second of the two orthogonal planes, thereby to produce a scanning slit-shaped illuminating beam for scanning a specimen at the microscope, a return beam from the microscope is descanned by the first modified Offner collimating system in the second orthogonal plane, and the descanned return beam received through the beam splitting means by the second modified Offner collimating system from the first modified Offner collimating system is rescanned in the second orthogonal plane for producing a reconstructed image of the specimen at the eyepiece.

11. In combination with an optical microscope having an objective and an eyepiece, a confocal imaging system defining an optical path between the eyepiece and the objective, said confocal imaging system comprising means for forming a slit-shaped illuminating beam, a beam splitting means by which the slit-shaped illuminating beam is directed into the optical path for illuminating a specimen to be viewed, an optical relay system including a scanning element for transforming the illuminating beam into a scanning beam, for directing the scanning beam into the microscope objective and thence onto the specimen to be viewed and for descanning a return beam from the specimen to form a descanned image of the specimen, a slit aperture at which said descanned image is focused in a line image, and a modified Offner collimating system comprising an inner mirror, the inner mirror of the modified Offner collimating system being caused to rotate to rescan said line image to reconstitute an image of the specimen at the eyepiece.

12. The combination according to claim 11, in which the optical relay system is also a modified Offner collimating system having a rotating inner mirror.

13. The combination according to claim 12, in which the two inner mirrors of the two modified Offner collimating systems rotate in synchronism.

14. The combination according to claim 13, in which the two inner mirrors rotate synchronously in anti-phase.

15. The combination according to claim 13, in which the inner mirrors rotate about parallel axes parallel to the objective of the length of the slit-shaped illuminating beam.

16. The combination according to claim 11, in which the slit aperture is of variable width.

17. The combination according to claim 11, in which the slit-shaped illuminating beam is produced by a cylindrical lens located in the path of a light beam emitted by a laser.

18. The combination according to claim 11, including a field lens through which the scanned illuminating beam is directed from the optical relay system into the microscope objective.

19. The combination according to claim 18, in which the field lens, the slit aperture and the image plane of the eyepiece are confocal, the optical relay system and the modified Offner collimating system both acting as 1:1 optical relays.

* * * * *